United States Patent [19]
Christie

[11] 3,865,778
[45] Feb. 11, 1975

[54] HEAT VULCANIZABLE SILICONE RUBBER COMPOSITIONS RESISTANT TO OIL DEGRADATION

[75] Inventor: George Christie, Loudonville, N.Y.

[73] Assignee: General Electric Company, New York, N.Y.

[22] Filed: Feb. 7, 1974

[21] Appl. No.: 440,377

[52] U.S. Cl. .............................. 260/37 SB
[51] Int. Cl. .............................. C08g 51/04
[58] Field of Search ................. 260/37 SB

[56] References Cited
UNITED STATES PATENTS

| | | | |
|---|---|---|---|
| 3,179,546 | 4/1965 | Fischer | 260/37 SB X |
| 3,184,427 | 5/1965 | Russell et al. | 260/37 SB |
| 3,821,140 | 6/1974 | Milbert | 260/37 SB X |

Primary Examiner—Lewis T. Jacobs
Attorney, Agent, or Firm—Donald J. Voss; E. Philip Koltos; Frank L. Neuhauser

[57] ABSTRACT

A heat vulcanizable silicone rubber composition which is resistant to degradation by hydrocarbon oils and having a specific gravity in the cured state of 1.20 to 1.70 comprising an organopolysiloxane polymer and blends of organopolysiloxane polymers having a viscosity of anywhere from 1,000,000 to 200,000,000 centipoise at 25°C, a curing catalyst, a silica filler selected from the class consisting of fumed silica, precipitated silica and mixtures thereof, an inorganic filler which may be any of the well known inert organic fillers such as, ground silica, diatomaceous earth and etc., and a small concentration of magnesium oxide and mixtures of various magnesium oxide.

20 Claims, No Drawings

HEAT VULCANIZABLE SILICONE RUBBER COMPOSITIONS RESISTANT TO OIL DEGRADATION

BACKGROUND OF THE INVENTION

The present invention relates to a heat vulcanizable silicone rubber composition and more particularly relates to a heat vulcanizable silicone rubber composition which is resistant to degradation by corrosive hydrocarbon oils.

As is well known, engine oils, transmission fluids and other hydrocarbon oils utilized in vehicles and other systems tend to degrade rubbers and specifically organic rubbers. Although silicone rubber compositions and silicone elastomers are more resistant than organic elastomers to degradation by hydrocarbon oils, still most of such silicone elastomers still do not sufficiently resist degradation by highly corrosive hydrocarbon oils especially, for instance, engine oils that have been utilized in a vehicle for 10,000 or 20,000 miles or more.

The usual test for testing resistance to degradation of an elastomer to hydrocarbon oil is in accordance with ASTM test D-471-68. In such a test there is utilized either a low aniline point hydrocarbon oil containing 20 to 30 percent aromatics or a high aniline point hydrocarbon oil containing 1 to 2 percent aromatics. Usually, the low aniline point hydrocarbon oil containing 20 to 30 percent aromatics is utilized to simulate the effects of engine oil on elastomers. In such a test, a slab of the elastomer is immersed in the hydrocarbon oil and preferably a low aniline point hydrocarbon oil for 70 hours at a temperature of 350°F. At the end of the time the elastomer is tested for compression set as well as its physical properties. Thus, preferably such an elastomer that is tested has a Tensile Strength of anywhere from 700 to 1200 psi, Elongation of anywhere from 100 to 400 percent, a Durometer of anywhere from 40 to 80, and a Compression Set that does not exceed 60%, that is, the elastomer has at least 40% return after being immersed in the low aniline hydrocarbon oil in the above ASTM test.

It was found that almost all organic elastomers and even most silicone elastomers which passed the foregoing test would still fail when utilized as seals, gaskets or in other uses when such elastomers were tested in hydrocarbon oils that were 20,000 miles old.

Accordingly, a procedure was devised to test elastomers in the above ASTM test utilizing used engine oil, that is, engine oil that had been utilized in the motor of a vehicle for 20,000 or 30,000 miles or more, that is, the silicone elastomer would be immersed for 70 hours in the old oil and then tested for its physical properties and compression set. Most elastomers tested in this manner did not meet the requirements and did not have the desired physical properties and compression set that has been set forth above.

Also, another way of simulating used engine oil was to run the same ASTM test utilizing a low aniline point hydrocarbon oil by immersing the elastomer slab in the low aniline point hydrocarbon oil for a period of 600 hours or more instead of the usual 70 hours at a temperature of 300°F to 350°F, and then testing the resulting immersed elastomer for its physical properties and compression set. It was found that most elastomers tested in this manner also did not have the requisite physical properties and compression set after it being so immersed. Specifically, most of the preferred silicone elastomers and specifically heat vulcanizable silicone rubber compositions that were tested in this advance test with used engine oil or immersed for a period of 600 hours at 300°F to 350°F in new oil were comprised of a dimethylpolysiloxane polymer or polymer blend containing anywhere from 0.2 to 0.6 mole percent vinyl, a fumed silica, process aids, peroxide curing catalysts and even certain amounts of inorganic filler such as, diatomaceous earth. Nevertheless, these compositions still failed to have the requisite hydrocarbon oil resistant characteristics when tested in the advance test. At the end of the testing period such silicone elastomers did not have the combination of properties of a Durometer between 40 and 80 and preferably 50 to 80, an Elongation between 100 percent to 400 percent and preferably from 100 to 200 percent and a Tensile of 700 to 1200 psi.

In addition, the prior art silicone elastomers so tested did not have the desired Compression Set. In the Compression Set test there is made an "O" ring made from the cured silicone elastomer which is then subjected to a load so as to compress it 25 percent for 24 hours while maintaining the O ring at a temperature of 400° to 450°F. In such a test, it is desirable to have at a maximum only 60% compression set and more preferably at a maximum only 15% compression set. The prior art silicone elastomers that were immersed or tested with used engine oil of 20,000 miles or more or were tested with the low aniline point hydrocarbon oil in the above ASTM test for 600 hours at 300°F to 350°F, all failed the compression set test as well as did not have the above advantageous combination of physical properties.

Accordingly, it was entirely unexpected that a unique combination of fumed or precipitated silica and mixtures thereof in combination with certain inorganic fillers and in combination with certain specific concentrations of magnesium oxide and/or mixtures of magnesium oxide of various particle size would result in a cured heat vulcanizable silicone rubber elastomer which would be highly resistant to degradation by used engine oil in the ASTM test for immersion for 70 hours at 300° to 350°F.

Also, by the above combination of ingredients and the new composition of the present case, it is possible to obtain a heat cured silicone elastomer having a specific gravity of generally anywhere from 1.20 to 1.70 and more preferably from 1.35 to 1.50. Such a specific gravity highly enhances the utility of the novel composition of the present case for sealant and gastket uses in which the elastomer will come in contact with engine oils, transmission fluids and other types of hydrocarbon oils and specifically highly corrosive hydrocarbon oils.

It is one object of the present invention to provide for a novel heat vulcanizable silicone rubber composition which is highly resistant to degradation by hydrocarbon oils.

It is another object of the present invention to provide for a novel silicone elastomer which is resistant to degradation by used engine oil and used hydrocarbon oils which are highly corrosive.

It is another object of the present invention to provide a heat vulcanizable silicone elastomer which is prepared by the utilization of certain concentrations and combinations of fillers and magnesium oxide as well as mixtures of magnesium oxide which silicone elastomer is highly resistant to corrosive hydrocarbon oils and specifically used hydrocarbon oils.

It is an additional object of the present invention to provide a heat vulcanizable silicone elastomer resistant to degradation by either new or used hydrocarbon oils for extended periods of time and which silicone elastomer has a specific gravity in the cured state of anywhere from 1.20 to 1.70.

These and other objects of the present case are accomplished by means of the invention set forth herein below.

SUMMARY OF THE INVENTION

In accordance with the above objects, there is provided by the present invention a heat vulcanizable silicone rubber composition which is resistant to degradation by hydrocarbon oils and having a specific gravity in the cured state of 1.20 to 1.70 comprising 100 parts of an organopolysiloxane polymer and blends of an organopolysiloxane polymer having a viscosity of anywhere from 1,000,000 to 200,000,000 centipoise at 25°C of the formula,

$(R)_a SiO_{(4-a)/2}$, from 0.1 to 10 parts of a curing catalyst selected from the class consisting of organic peroxides and high energy electric radiation; from 25 to 60 parts of a silica filler selected from the class consisting of fumed silica and precipitated silica and mixtures thereof; from 5 to 80 parts of an inert organic filler selected from the class consisting of titanium oxide, iron oxide, aluminum oxide, diatomaceous earth, calcium carbonate, ground silica, quartz, diatomaceous silica, aluminum silicate, zinc oxide, zirconium silicate, barium sulfate, zinc sulfide, aluminum silicate, and finely divided silica having surface-bonded alkoxy groups and mixtures thereof; and from 0.1 to 15 parts of an ingredient selected from the class consisting of magnesium oxide and mixtures of magnesium oxide of different particle size where R is selected from monovalent hydrocarbon radicals and halogenated monovalent hydrocarbon radicals, and a varies from 1.95 to 2.01, inclusive.

It should be noted that the above concentration and combinations of silica filler, that is, fumed or precipitated silica filler, inert organic filler and magnesium oxide is necessary to produce the advantageous composition of the present invention. Generally, the magnesium oxide or magnesium oxide of various particle sizes may be utilized at a concentration of 0.1 to 15 parts per 100 parts of the organopolysiloxane polymer and more preferably from 2 to 10 parts of the organopolysiloxane polymer.

In a more preferred combination, there is utilized in the present composition mixtures of magnesium oxides where there is a first magnesium oxide of a particle size such that 99 percent by weight passed through a screening of U.S. mesh size varying from 275 to 300 and a second magnesium oxide of a particle size such that 99 percent by weight passed through a screen of U.S. mesh size varying from 325 to 350, where said second magnesium oxide and said second magnesium oxides are present at a ratio varying from 1.1 to 5 to 5 to 0.1. In addition, the present composition may contain process aids, bridging agents, fibrous materials such as, polytetrafluoroethylene, dacron, cotton and other materials, heat stabilizing additives, pigments and other known ingredients for heat vulcanizable silicone rubber compositions. Also, such materials as tracing agents such as, vanadium carbide or cobalt oxide may be utilized in the composition at very low concentrations such as, .005 parts per 100 parts of the organopolysiloxane polymer.

Preferably, the organopolysiloxane polymer contains from 0.001 to 0.7 mole percent of vinyl substituent radicals and more preferably from 0.2 to 0.6 mole percent vinyl substituent radicals. It should be noted, of course, and has been stated in the above Summary of the Invention, that the organopolysiloxane polymer may not be a single polymer but may be blends of various polymers which various single polymers which form the blend may contain vinyl or no vinyl substituents. It is only desirable that the total blend have a vinyl concentration as set forth above for proper curing characteristics of the composition.

It should also be noted that the above composition may be prepared by preparing individual compositions with certain of the above fillers, process aids and other ingredients and/or magnesium oxide and organopolysiloxane polymers or blends or organopolysiloxane polymers and then these individual compositions in the uncured state may then be blended together to obtain a single composition and the resulting single composition cured to a silicone elastomer. The blending of organopolysiloxane polymers in the forming of one or two more compositions which are then blended into a single composition may be carried out as manufacturing practices dictate. It is only necessary that the final composition contain the basic ingredients as set forth above to come within the scope of the present invention. It is the combination of certain fillers with certain concentrations of magnesium oxide that results in a final single heat cured silicone elastomer having the advantageous hydrocarbon oil resistant properties discussed previously.

DESCRIPTION OF THE PREFERRED EMBODIMENT

The R radicals in the organopolysiloxane polymer or blends of organopolysiloxane polymers and specifically a diorganopolysiloxane polymer having a viscosity of anywhere from 1,000,000 to 200,000,000 centipoise at 25°C are preferably selected from monovalent hydrocarbon radicals, halogenated monovalent hydrocarbon radicals, and cyanoalkyl radicals. Such radicals are preferably alkyl radicals such as, methyl, ethyl, propyl; cycloalkyl radicals such as, cyclohexyl, cycloheptyl; alkenyl radicals such as, vinyl, allyl; halogenated alkyl radicals such as, fluoropropyl, trifluoropropyl and specifically fluorinated alkyl radicals of the formula $R^4CH_2CH_2-$, where $R^4$ is a perfluoroalkyl radical; mononuclear aryl radicals such as, phenyl; alkaryl radicals such as, methylphenyl, ethylphenyl; aralkyl radicals such as, phenylmethyl, phenylethyl; cyanoalkyl radicals such as, cyanopropyl and etc., and other such substituent radicals which are commonly to be found as substituent groups on linear diorganopolysiloxanes. Most preferably, the R radical is selected from alkyl radicals of 1 to 8 carbon atoms; alkenyl radicals of 2 to 8 carbon atoms; halogenated alkyl radicals such as, fluoroalkyl radicals of 3 to 8 carbon atoms and mononuclear aryl radicals such as, phenyl.

Such diorganopolysiloxane polymers in the most preferred process are formed by hydrolyzing diorganodihalogensilanes of about 99 percent purity in water. It is preferred in this process to add the diorganodihalogensilane to the water so as to maintain the temperature of the hydrolysis mixture as close to room temperature as possible so as to prevent the boiling off of the low boiling silanes. It is sometimes preferred in such a process to have an organic water immiscible solvent present such as, xylene or toluene, or even a polar solvent present such as, acetone, although this is not necessary. The solvent stabilizes the formation of the low molecular weight diorganopolysiloxanes and cyclics that are formed.

The hydrolysis mixture is then taken and the water separated from it. In addition, the siloxane hydrolysis mixture is preferably neutralized to within 5 to 10 parts per million of acid.

In the next step, the hydrolysis mixture is then taken and if a solvent is not present in the initial hydrolysis mixture there is added to it a water-immiscible organic solvent such as, xylene, toluene, benzene and etc. To this siloxane hydrolysis mixture and a water-immiscible organic solvent there is added anywhere from 5 to 100 parts per million of an alkaline metal hydroxide such as, potassium hydroxide and the resulting mixture is refluxed at a temperature above 100°C. In this cracking procedure the distillation column is maintained such that there is preferentially distilled overhead a mixture of cyclicpolysiloxanes of which 99 percent of the mixture is composed of cyclictrisiloxanes, cyclictetrasiloxanes, and cyclicpentasiloxanes. The substituent groups in these cyclicsiloxanes is the same as for the initial diorganodihalogensilanes that were hydrolyzed. It should be noted that the organic substituent groups in the diorganodihalogensilane that is initially used to produce these cyclicpolysiloxanes, are the hydrocarbon substituent groups and the halogenated hydrocarbon substituent groups that have been defined above for the diorganopolysiloxane polymer. Such substituent groups can be any of the substituent groups specifically set forth in the description and definition of the R substituent radical. In the organopolysiloxane polymer that is finally formed, there can be a mixture of various substituent groups such as, alkyl groups of 1 to 8 carbon atoms, that all be the same or there can be a mixture of substituent groups, that is, various alkyl groups of 1 to 8 carbon atoms, alone or mixed with various alkenyl radicals of 2 to 8 carbon atoms such as, vinyl, allyl, alone or mixed with various halogenated alkyl radicals such as, fluoroalkyl radicals which can be alone or mixed with various types of mononuclear aryl radicals. These substituent groups as has been specified may be different and may be present in the desired concentrations at which it is desired they appear in the final diorganopolysiloxane polymer. It is only necessary in the preparation that the original diorganodihalogensilanes that were hydrolyzed contain the substituent groups in the types and concentrations in which it is desired that they appear in the final diorganopolysiloxane polymer.

Continuing, the mixtures of cyclics that are distilled overhead in the refluxing process of the siloxane hydrolyzate which is cracked with KOH are then taken and utilized to produce the high viscosity diorganopolysiloxane polymer. It should be noted that individual processes may be utilized to produce cyclicsiloxanes composed of only methyl or only vinyl substituent groups or cyclicsiloxanes composed solely of fluorinated alkyl substituent groups. These cyclicpolysiloxanes in the next step may then be mixed at the desired proportions in which the substituent groups are desired to appear in the final high viscosity diorganopolysiloxane polymer.

Accordingly, the various cyclicpolysiloxanes in the desired porportions are then mixed together and there is utilized a water-immiscible organic solvent to dissolve the cyclicsiloxanes. However, a solvent is not necessary in this step of the process.

Accordingly, when the cyclicpolysiloxanes have been mixed in the proper proportions together there is added to them an alkali metal hydroxide catalyst at a concentration of anywhere from 5 to 100 parts per million and there is additionally added to the mixture the proper propotion of chain-stoppers such as, low molecular triorganosiloxy end-stopped diorganopolysiloxanes and disiloxanes. The organo groups in these chain-stoppers may be any of the substituent groups that were defined for the R radical previously or be a mixture of any such hydrocarbon substituent groups and halogenated hydrocarbon substituent groups defined for the R radical previously. The amount of chain-stoppers or triorganosiloxy end-stopped diorganopolysiloxanes is such that it is deemed to be sufficient to form the desired viscosity linear diorganopolysiloxane polymer. Accordingly, with this mixture of ingredients of cyclicsiloxanes, chain-stoppers and catalysts and possibly solvent, the mixture is heated at temperatures of 150° to 200°C for anywhere from 1 to 10 hours until the desired polymer is formed, that is, the polymer coming within the scope of formula (1) and having a viscosity of anywhere from 1,000,000 to 200,000,000 centipoise at 25°C. Preferably, such a polymer contains from 0.001 to 0.7 mole percent of vinyl groups and more preferably contains from 0.2 to 0.6 mole percent of vinyl or other alkenyl substituent groups.

It must be appreciated that in the process of the present invention there need not be used a single diorganopolysiloxane polymer having a viscosity of 1,000,000 to 200,000,000 centipoise at 25°C, in that in the composition of the present invention there may be utilized blends of two, three, four or more specific diorganopolysiloxane polymers having a viscosity of anywhere from 1,000,000 to 200,000,000 centipoise at 25°C in which the final polymer blend has a viscosity of anywhere from 1,000,000 to 200,000,000 centipoise at 25°C; a vinyl content of generally anywhere from 0.001 to 0.7 mole percent and preferably from 0.2 to 0.6 mole percent in which each specific diorganopolysiloxane polymer is within the scope of formula (1).

In the composition of the present invention there is also present per 100 parts of the organopolysiloxane polymer from 0.1 to 10 parts of a curing catalyst selected from the class consisting of organic peroxides and high energy electron radiation. If too little catalyst is utilized the composition will not cure to a silicone elastomer at elevated temperatures and if too much curing catalyst is used it serves no useful function. Preferably, there is utilized a concentration of a curing catalysts from 0.1 to 5 parts based on 100 parts of the diorganopolysiloxane polymer or blends of polymers.

The curing catalyst is preferably diisopropyl peroxide, t-butylperbenzoate or 2,5 bis(t-butylperoxy)2,5-dimethylhexane. The general description of the curing catalysts of the present invention is as follows:

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

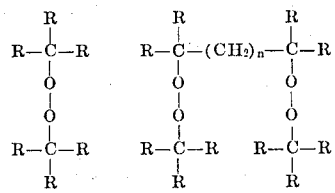

wherein R represents the same alkyl group throughout or alkyl groups of two or more different types and n is zero or a larger integer.

Among the specific peroxide curing catalysts that are preferred are di-tertiary-butyl peroxide, tertiary-butyl-triethylmethyl peroxide, tertiary-butyl-tertiary-butyl-tertiary-triphenyl peroxide, t-butyl perbenzoate and a di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroalkyl peroxides such as, 1,4-dichlorobenzoyl peroxide; 2,4-dichlorobenzoyl peroxide, monochlorobenzoyl peroxide, benozyl peroxide, methylethyl-ketone peroxide, azo-bis-isobutyronitrile, etc. Generally, 0.1 to 8 percent of said peroxide by weight of the polydiorganosiloxane gum is used to cure the silicone rubber composition and preferably 0.5 to 3.0 percent by weight of the above curing catalyst, t-butyl perbenzoate is preferred.

In the basic composition of the diorganopolysiloxane polymer and the curing catalyst, it must be pointed out that the curing catalyst is usually added to the composition in the last mixing step prior to cure. There must be added in accordance with the present invention, generally, from 25 to 60 parts of a reinforcing silica filler selected from the class consisting of fumed silica and precipitated silica and mixtures thereof. Most preferably the silica filler is fumed silica. If less than 25 parts of silica filler are utilized and specifically the reinforcing type of silica filler, then the composition will not have the advantageous resistance to oils. If more than 60 parts of extending silica filler is utilized the composition does not have sufficient elongation in the desired range. Most preferably, there is utilized from 30 to 50 parts of reinforcing silica filler selected from the class consisting of fumed silica and precipitated silica. The reinforcing silica filler that is utilized in the present invention may be treated or untreated, preferably, most if not all of it, is treated whether it is treated insitu in preparing the composition of the present invention or whether it is treated prior to being incorporated into the diorganopolysiloxane polymer. The reinforcing silica fillers are most commonly and preferably treated with cyclic polysiloxanes as, for instance, disclosed in Lucas, U.S. Pat. No. 2,938,009, whose disclosure is incorporated into the present case by reference. Silica fillers are also advantageously treated with a mixture of cyclicpolysiloxanes and silazanes as well as such compounds as ammonia and amines as, for instance, disclosed in Smith, U.S. Pat. No. 3,635,743, whose disclosure is hereby incorporated into the present case by reference or as disclosed in the patent application of Melvin Dale Beers, entitled "Process for Treating Silica Fillers", Ser. No. 311,486, filed December 4, 1972 now U.s. Pat. No. 3,837,878, issued Sept. 24, 1974. The reinforcing silica filler may also be treated insitu in preparing the compositions of the present invention such that when the untreated reinforcing silica filler is incorporated into the diorganopolysiloxane polymer, there may be added from 2 to 20 parts based on 100 parts of the diorganopolysiloxane polymer or blends of such diorganopolysiloxane polymers of cyclicpolysiloxanes and/or silazanes and other treating agents and the resulting mixture cooked at elevated temperatures such that the untreated reinforcing silica filler is treated insitu in the preparation of the silicone elastomer of the present case.

Along with the reinforcing silica filler there must be present in the advantageous composition of the present case, from 5 to 80 parts of an inert organic filler and preferably from 10 to 50 parts of an inert organic filler selected from the class consisting of titanium, iron oxide, aluminum oxide, diatomaceous earth, calcium carbonate, ground silica, quartz, diatomaceous silica, aluminum silicate, zinc oxide, chromium silicate, barium sulfate, zinc sulfide, aluminum silicate, and finely divided silica having surface bonded alkoxy groups and mixtures thereof. The inert organic filler that is utilized in the composition of the present invention may be a mixture of the various inorganic fillers set forth above. It is obvious while this above list of inert organic fillers that may be utilized in the present invention lists various inorganic fillers, it is not by any means all inclusive. Any other inert inorganic fillers that are commonly utilized in producing heat vulcanizable silicone rubber compositions may be utilized alone or with the other fillers set forth above at a concentration of generally 5 to 80 parts per 100 parts of the diorganopolysiloxane polymer.

It also can be appreciated the reinforcing silica fillers may not only be composed solely of fumed silica or precipitated silica but may be a mixture of these fillers whether they are treated or untreated. If less than 5 parts of the inert organic filler is utilized, the cured elastomer of the present invention does not have the desired resistance to degradation from hydrocarbon oils. If more than 80 parts of inert organic filler is utilized, then the resulting cured elastomer does not have the desired elongation and does not have the desired compression set.

In the basic composition of the present invention, there is utilized from 0.1 to 15 parts of an ingredient selected from the class consisting of magnesium oxides and mixtures of various magnesium oxides of various particle sizes. More preferably, there is utilized a concentration of magnesium oxide at a level of 0.5 to 10 parts per 100 parts of the diorganopolysiloxane polymer or blends of such polymers. If less than 0.1 parts of the magnesium oxide is utilized then the desired resistance to hydrocarbon oils of the final cured silicone elastomer and particularly the resistance to used engine oils is not obtained. If more than 15 parts of the magnesium oxide is used per 100 parts of the diorganopolysiloxane polymer, then the excess magnesium oxide serves no useful purpose and in addition tends to deleteriously effect the physical properties of the cured silicone elastomer. Although any type of magnesium oxide may be used in the compositions of the present invention, it is preferred to utilize a magnesium oxide of a small particle size, that is, a magnesium oxide in which 99 percent by weight will pass through U.S. mesh screen size, varying from 250 to 350. More preferably, and in one embodiment of the present invention there is desirably utilized two or more various particle sizes of magnesium oxide. For instance, there is preferably utilized in the present invention, a mixture of magnesium oxides in which there is present a first magnesium oxide of a particle size such that 99 percent weight passes through a screen of U.S. mesh size varying from 275 to 300 and a second magnesium oxide of a particle size such that 99 percent by weight passes through a screen of U.S. mesh size varying from 325 to 350, where said first magnesium oxide and second magnesium oxide are present at a ratio varying from 0.1:5 to 5:0.1 and preferably varying at a ratio of 0.1:2.5 to 2.5:0.1. It should be understood that irrespective of whether a single type of magnesium oxide is used or a mixture of magnesium oxides, the total concentrations of the magnesium oxide in the compositions of the present invention must vary from 0.1 to 15 parts per 100 parts of the diorganopolysiloxane polymer and preferably varies at a concentration of 0.5 to 10 parts of magnesium oxide per 100 parts of the diorganopolysiloxane polymer.

The above forms the basic composition of the present invention. The ingredients are added to the polymer until there is a mixture which has become homogeneous and then the mixture is screened to remove any dirt. Finally, the curing catalyst is added to it at the indicated concentrations and the compositions cured at elevated temperatures of above 150° to 300°C to form the advantageous oil resistant silicone elastomer of the present case.

In addition to the above ingredients, it is common to add various other ingredients to heat vulcanizable silicone rubber compositions for the purpose of improving the properties of the heat cured silicone elastomer as well as to add color and various other incidental properties such as, tracing properties, to the cured silicone elastomer.

It must be pointed out that to the basic composition of the present case there may be added any of the ingredients commonly added to heat vulcanizable silicone rubber compositions. For instance, a process aid is advantageously utilized in the composition of the present case at a concentration of 1 to 25 parts based on 100 parts of the high viscosity organopolysiloxane polymer or blends of such polymers.

There is also employed in the present composition 1 to 25 parts and preferably 5 to 15 parts based on the polydiorganosiloxane gum of a process aid for preventing the gum and the filler mixture from structuring prior to curing and after compounding. One example of such a process aid is a compound of the formula,

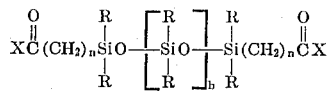

where R is a member selected from the class consisting of methyl and phenyl, X is a member selected from the class consisting of —OH, —NH$_2$ or —OR', where R' is methyl or ethyl, $n$ has a value of from 2 to 4, inclusive, and $b$ is a whole number equal to from 1 to 10, inclusive. Further details as to the properties, as well as the method of preparation of the compound of formula (1), are to be found in the disclosure of Martellock, U.s. Pat. No. 3,464,945, which is herein incorporated by reference.

The process aid may also be a dihydrocarbonsubstituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the gum of formula (1). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation is to be found in the disclosure of Fekete, U.S. Pat. No. 2,954,357, which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. the hydroxylated materials include both monomers such as diphenylsilanediol and polymeric materials which contain two silicon-bonded OH groups in the molecule. In addition, the hydroxylated organosilane may be a mixture of hydroxylcontaining siloxanes and completely condensed siloxanes. Irrespective of the particular composition of the hydroxylated organosiloxane, it is necessary that there be present in said organosiloxane from one OH to 70 silicon atoms to two OH per silicon atom.

The hydroxylated siloxanes may be prepared by any suitable method, such as heating said siloxanes with steam under pressure at temperatures of about 120°C or hydrolyzing silanes of the formula $R_nSiX_{4-n}$, where X is any hydrolyzable group such as Cl OH, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclic aryl hydrocarbon radicals. Further, detailed information as to the hydroxylated organosiloxanes which may be used as process aids is to be found in Konkle et al, U.S. Pat. No. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

The process aid is usually added to the heat vulcanizable silicon rubber composition in order to facilitate the mixing of the ingredients and specifically the filler ingredients into the organopolysiloxane gum or polymer and also so as to prevent the final heat cured silicone rubber elastomer from crepe-aging (crepe-aging meaning that the final mixture of ingredients in the heat vulcanizable silicone rubber compositions will not unduly harden during storage prior to cure).

Another ingredient that the basic composition of the present invention may contain is a bridging agent. Thus, it is preferred that the composition of the present invention contain from 0.5 to 5 parts of a bridging agent of the formula $R'Si(OR^2)_3$, where $R'$ is selected from the class consisting of vinyl and allyl and $R^2$ is an alkyl radical of 1 to 8 carbon atoms. The function of such a bridging agent in the composition of the present invention is that upon curing the composition will cure more tightly and form a more cohesive silicone elastomer upon cure. Although such additives such as a bridging agent are optional in the composition of the present invention, they are desirable in the composition so as to form a cured silicone elastomer of higher tensile strength.

Another optional ingredient that may be present in the basic composition of the present invention is a fiber such as, for instance, generally from 0.1 to 10 parts and more preferably from 0.1 to 5 parts of a fibrous material selected from the class consisting of polytetrafluoroethylene, dacron fibers, cotton fibers, polyester fibers, asbestos fibers and also other fibers such as, wool, cotton, as is well known in the art. These fibrous materials are advantageously inserted into the composition of the present invention for the purpose of making the cured silicone elastomer tougher and of higher tensile strength.

Further, there may be added into the basic composition of the present case as optional additives various heat stabilizing ingredients as well as pigment ingredients at a concentration of anywhere from 0.1 to 5 parts such heat stabilizing ingredients being, for instance, iron oxide and cerium salts of 2-ethylhexonate.

In addition, optional ingredients which may be added are tracing materials such as, vanadium carbide of a 3 to 4 micron particle size at a concentration of anywhere from 0.001 to 0.009, based on 100 parts of a diorganopolysiloxane polymer or blends of such polymers, which tracing ingredients may serve various tracing functions to certain users of heat vulcanizable silicone rubber compositions.

It can also be appreciated that other ingredients that are common in heat vulcanizable silicone rubber compositions for the purpose of rendering certain advantageous properties to the final cured elastomer may be utilized in the composition of the present case to impart to it more advantageous properties such as, for instance, the use of platinum to enhance the flame retardance of the composition of the present invention. Such use of platinum is disclosed in Noble and Brower, U.S. Pat. No. 3,514,424, whose disclosure is hereby incorporated into the present case by reference. In addition, the use of cyanurates or isocyanurates for the purpose of improving the self-bonding characteristics of the final heat cured elastomer as disclosed in the patent application of George DeZuba, Abe Berger and Terry G. Selin, Ser. No. 352,125, filed on Apr. 18, 1973, now U.s. Pat. Ser. No. 3,813,364, issued May 28, 1974, is hereby incorporated into the present case by reference.

It must also be specified that as in the case of the diorganopolysiloxane polymer which may not be a single polymer but may be blends of such organopolysiloxane polymers coming within the scope of formula (1), that there may be prepared compositions from such polymers and blends of polymers containing any of the ingredients set forth above and that the individual compositions prior to cure may be mixed or milled into each other to form a single composition. The catalyst may then be milled into the final mixture and the composition cured. Thus, individual compositions may be prepared with diorganopolysiloxane polymers of a viscosity of anywhere from 1,000,000 to 200,000,000 centipoise at 25°C with any of the various fillers, reinforcing and non-reinforcing, and magnesium oxide as set forth above and some or all the additives specified above and then the individual compositions may then be simply mixed together to form a single composition to which the curing catalyst is added and the composition cured. It is only necessary in accordance with the present invention that the final composition have the basic fillers and magnesium oxide concentrations as well as diorganopolysiloxane polymer concentrations as set forth previously in the basic definition of the composition of the present invention.

In preparing the compositions of the present case whether one composition or more than one composition, the following procedure is exemplary. First, the polymer or blend of polymers is put into a doughmixer and mixed to polymer uniformity. Then the non-reinforcing fillers, that is, the inert organic fillers and process aids or heat stabilizers, are added to the polymer and mixed to uniformity with an inert gas purge. Then the fumed silica or precipitated silica is added with reduced inert gas purge at a temperature of about 130°C. Then the fibrous material and other ingredients are added to the doughmixer and mixed into the composition until the composition is uniform. At that time the composition is then heated and cooked for 5 hours at a temperature of anywhere from 165° to 175°C, so as to remove volatiles from the composition. The composition may then be strained through a 100 mesh screen to remove impurities. This composition may then be taken after it has been strained to remove impurities and milled on a rubber mill so as to add the proper amount of catalyst and shape into the desired shape. It may then be cured at elevated temperatures of 150° to 300°C for a period of time of 15 minutes to 5 hours to form the desired silicone elastomer of the present case. If individual compositions are prepared as indicated below, then they are mixed together until uniform on a rubber mill, At that time, additional additives may be added such as tracing agent, pigment masterbatches and the curing catalyst and the final composition mixed to uniformity and shaped to the desired shape prior to vulcanization.

It is also common to use a pigment masterbatch in the preparation of such heat vulcanizable silicone rubber compositions. A pigment masterbatch being nothing more than the dispersement of the desired pigment or color in a portion of the diorganopolysiloxane polymer and a certain amount of reinforcing or non-reinforcing filler, which pigment masterbatch is then added at the concentrations of 1 to 10 parts per 100 parts of the polymer composition and the compositions are milled to uniformity. The pigment masterbatch is utilized to facilitate the mixing of the pigment into the uncured silicone rubber composition, since the addition of the pigment directly to the polymer in the doughmixer is difficult and time consuming. As stated previously, even with the use of a pigment masterbatch it is necessary that the final composition contain the amounts of organopolysiloxane polymer, types of organopolysiloxane polymers and blends of such polymers, types and amounts of reinforcing silica filler and types and amounts of inorganic filler as well as concentrations of magnesium oxide and various magnesium oxides and other ingredients as defined previously, to form the basic advantageous oil resistant heat cured silicone elastomer of the present case.

With the composition of the present invention there will be produced cured silicone elastomers which after immersion in a low aniline point oil in the ASTM test referred to previously for a period of 600 hours at 300°F or 350°F, or being immersed in the same test in used engine oil will have a durometer varying from 40 to 80 and preferably from 50 to 80, an elongation varying from 100 to 400 percent and preferably from 100 to 250 percent and a tensile strength varying from 700 to 1200 psi. Also, as far as compression set such a composition after being immersed in the above oils will have a compression set of a maximum of 60 percent and preferably a maximum of 15 percent. The basic composition of the present invention in the cured state and prior to immersion in the hydrocarbon oil will have a specific gravity that varies anywhere from 1.20 to 1.70 and preferably a specific gravity in the cured state prior to immersion in the hydrocarbon oil that varies from 1.35 to 1.50. The composition with its advantageous properties of the present invention is highly suitable to form seals, gaskets and rubber parts coming into contact with hydrocarbon oils such as, transmission oils and engine oils.

The examples given below are given for the purpose of illustrating the present invention and are not given for the purpose of defining or limiting the scope of the present invention. All parts in the examples are by weight.

EXAMPLE 1

There was prepared a composition, which shall be referred to as Composition 1, composed of 51.26 parts of undevolutilized dimethylpolysiloxane, trimethylsiloxy end-stopped containing 0.2 mole percent methylvinyl and undevolutilized dimethylpolysiloxane polymer dimethylvinylsiloxy chain-stopped with 0.2 mole percent methylvinyl, where the polymer blend had a viscosity of 12,400,000 centipoise, 5.13 parts of a low molecular weight process aid comprising a copolymer containing 70 mole percent of dimethyl units and 30 mole percent of diphenyl units terminated with methoxydimethyl groups having a viscosity of 100 centipoise at 25°C.

To this mixture there was added 0.51 parts of vinyltriethoxysilane, 22.04 parts of fumed silica, 5.13 parts of Magalite K which is a magnesium oxide having a particle size, where 99 percent by weight passes through a 275 to 300 mesh screen, 15.47 parts of a diatomaceous earth, 4.6 parts of polytetrafluoroethylene emulsion in water which contains 60 percent solids. The individual ingredients were mixed as follows. The polymers were added to a clean doughmixer and the polymers were mixed to uniformity and then there was added the diatomaceous earth, the vinyltriethoxy silane, Magalite K, the methoxy end-stopped process aid and the mixture was mixed to uniformity with an inert gas purge. At that time, the untreated fumed silica was added with a reduced inert gas purge wherein the mixture was maintained at a temperature of 130°C. At this point, the polytetrafluoroethylene emulsion was added and mixed to uniformity, then the batch was inspected for proper massing and the heat-up and cook cycle was started, wherein the mass was continually mixed for 5 hours at a temperature of 165° to 175°C, with an inert gas purge at the start of the cook cycle. At the end of that time, the mass was transferred from the doughmixer and strained through a 100 mesh screen to remove impurities to form the purified mixed composition.

There was then prepared a second composition, which shall be referred to as Composition 2, comprising 57.0 parts of undevolutilized dimethylpolysiloxane polymer which contained 0.2 mole percent methylvinyl groups and was dimethylvinyl chain-stopped of a viscosity of 22,000,000 centipoise, 0.4 parts of octamethylcyclotetrasiloxane, 4.2 parts of the process aid used in Composition No. 1, 0.2 parts of a heat stabilizer comprising a mixture of 3-ethylhexonate of the rare earth metals, lithium and cerium in alcohol which salts of the 2-ethylhexonate were present at 6 percent solids in the solution, 0.4 parts of vinyltriethoxysilane, 17.0 parts of untreated fumed silica, 26.4 parts of untreated ground silica and 3.3 parts of diatomaceous earth. The same general mixing procedure was followed as mixing Composition No. 1.

Then 35 parts of Composition No. 1 was blended with 65 parts of Composition No. 2 on a 10 × 24 rubber mill and 2.5 parts of pigment masterbatch and one part of magnesium oxide masterbatch were added. These various compositions were milled to uniformity on the mill for a period of 10 to 20 minutes. The magnesium oxide masterbatch contained 75 percent of a dimethylpolysiloxane polymer trimethylsiloxy endstopped having a viscosity of 15,200,000 centipose, and 25 percent of Magalite D, manufactured and sold by Merck & Company, where Magalite D is a magnesium oxide having a mass size such that 99 percent by weight passes through a U.s. screen mesh size varying from 300 to 325. The pigment masterbatch comprised 75 percent by weight of an iron oxide and 25 percent by weight of a dimethylpolysiloxane oil trimethylsiloxy end-stopped having a viscosity of 30,000 centipoise at 25°C.

The above concentration and composition ingredients were mixed on the mill until they were uniform, as stated previously, and then there was added 0.8 parts of 5-bis(t-butylperoxy)2,5-dimethylhexane. The resulting uniform milled composition was then formed to various slabs and cured at elevated temperatures of 175°C for ¼ hour to form the cured silicone elastomer. Such cured silicone elastomer had the following properties:

| Tensile Strength | 1000 psi |
| Durometer, Shore A | 70 ± 5 |
| Elongation | 150% |
| Tear Strength | 90 lbs/in. |
| Specific Gravity | 1.40 ± 0.02 |

An O ring was formed from the cured silicone elastomer which was tested with a load compressing it 25 percent by volume at a temperature of 300° to 350°F for 24 hours. At the end of that time, the O ring had only 15% compression set. Slabs of the cured elastomer were then immersed in accordance with ASTM test No. D-471-68 in used engine oil that had been utilized in the motors of vehicles for 20,000 miles and immersed in such engine oil for 400 hours at 350°F. At the end of that time, the elastomeric slabs of the other present composition as well as the O rings of the present composition that had been immerged in the engine oil were tested for physical properties, and had the following physical properties:

| Tensile Strength (% change) | −25 |
| Durometer (% change) | −13 |
| Volume Change (% change) | +11 |
| Elongation (% change) | −10 |

The O-ring that was formed from the cured silicone elastomer of the present case which had also been immersed in the used engine oil was also tested for compression set and had at a maximum only 40 percent compression set.

I claim:

1. A heat vulcanizable silicone rubber composition being resistant to degradation by hydrocarbon oils and having a specific gravity in the cured state of 1.20 to 1.70 comprising
   a. 100 parts of organopolysiloxane polymer and blends of organopolysiloxane polymers having a viscosity of 1,000,000 to 200,000,000 centipoise at 25°C of the formula,
   $(R)_a SiO_{4-a/2}$
   b. from 0.1 to 10 parts of a curing catalyst selected from the class consisting of organic peroxides and high energy electron radiation,
   c. from 25 to 60 parts of a silica filler selected from the class consisting of fumed silica and precipitated silica and mixtures thereof;
   d. from 5 to 80 parts of an inert organic filler selected from the class consisting of titanium, iron oxide, aluminum oxide, diatomaceous earth, calcium carbonate, ground silica, quartz, diatomaceous silica, aluminum silicate, zinc oxide, zirconium silicate, barium sulphate, zinc sulfide, aluminum silicate, finely divided silica having surface-bonded alkoxy groups and mixtures thereof;
   e. from 0.1 to 15 parts of an ingredient selected from the class consisting of MgO and mixtures of MgO of various particle sizes, where R is selected from monovalent hydrocarbon radicals and halogenated monovalent hydrocarbon radicals, a varies from 1.95 to 2.01, inclusive.

2. The composition of claim 1 wherein there is present a first MgO of a particle size such that 99 percent by weight passes through a screen of U.S. mesh size varying from 275 to 300 and a second MgO of a particle size such that 99 percent by weight passes through a screen of U.S. mesh size varying from 325 to 350, where said first MgO and said second MgO are present at a ratio varying from 0.1:5 to 5.0:1.

3. The composition of claim 1 wherein there is present a process aid at a concentration of 1 to 25 parts based on the organopolysiloxane polymer and the process aid is a dihydrocarbon-substituted polysiloxane oil having a hydrocarbon substituent to silicon atom ratio of 1.0 to 2.0 and where said hydrocarbon substituents comprise at least one member selected from the class consisting of methyl, ethyl, vinyl, allyl, cyclohexenyl and phenyl groups, said polysiloxane oil comprising polysiloxane molecules containing an average of from 1 to 2 lower alkoxy groups bonded to each of the terminal silicon atoms.

4. The composition of claim 1 wherein said silica filler is treated with a mixture of ingredients selected from the class consisting of cyclic polysiloxanes, silazanes and mixtures thereof.

5. The composition of claim 1 wherein the organopolysiloxane polymer and blends of polymers contain from 0.001 to 0.7 mole percent of vinyl substituent radicals.

6. The composition of claim 1 wherein there is present from 0.5 to 5 parts of a bridging agent of the formula,
$R'Si(OR^2)_3$
where R' is selected from the class consisting of vinyl and allyl and $R^2$ is an alkyl radical of 1 to 8 carbon atoms.

7. The composition of claim 1 wherein there is present from 0.1 to 10 parts of a fibrous material selected from the class consisting of polytetrafluoroethylene, dacron, cotton, polyester fibers and asbestos.

8. The composition of claim 1 wherein there is present 0.1 to 5 parts of a heat stabilizer additive selected from the class consisting of iron oxide, lanthanum 2-ethylhexonate and cerium 2-ethylhexonate.

9. The composition of claim 1 wherein the curing agent is dicumyl peroxide.

10. The composition of claim 1 wherein the catalyst is 2,5-bis(t-butylphenoxy)2,5-dimethylhexane.

11. A process for the production of a heat vulcanizable silicone rubber composition being in the cured state resistant to degradation by hydrocarbon oils and having a specific gravity of 1.20 to 1.70 comprising (a) mixing (i) 100 parts of an organopolysiloxane polymer and blends of organopolysiloxane polymers having a viscosity of 1,000,000 to 200,000,000 centipose at 25°C of the formula,
$(R)_a SiO_{4-a/2}$
ii. from 0.1 to 10 parts of a curing catalyst selected from the class consisting of organic peroxides and high energy electron radiation, iii. from 25 to 60 parts of a silica filler selected from the class consisting of fumed silica, precipitated silica and mixtures thereof,
iv. from 5 to 80 parts of an inert organic filler selected from the class consisting of titanium, iron oxide, aluminum oxide, diatomaceous earth, calcium carbonate, ground silica, quartz, diatomaceous silica, aluminum silicate, zinc oxide, zirconium silicate, barium sulphate, zinc sulfide, aluminum silicate, finely divided silica having surface-bonded alkoxy groups, and mixtures thereof;
v. from 0.1 to 15 parts of an ingredient selected from the class consisting of MgO and mixtures of MgO of various particle sizes where R is selected from monovalent hydrocarbon radicals, a varies from 1.95 to 2.01, inclusive, and
b. heating the resulting mixture at a temperature in the range of 100° to 300°C.

12. The process of claim 11 wherein there is present a first MgO of a particle size such that 99 percent by weight passes through a screen of U.S. mesh size varying from 275 to 300 and a second MgO of a particle size such that 99 percent by weight passes through a screen of U.S. mesh size varying from 325 to 350 where said first MgO and said second MgO are present at a ratio varying from 0.1:5 to 5.0:1.

13. The process of claim 11 wherein there is present a process aid at a concentration of 1 to 25 parts of the organopolysiloxane polymer and the process aid is a dihydrocarbon substituted polysiloxane oil having a hydrocarbon substituent to silicon atom ratio of 1.0 to 2.0 and where said hydrocarbon substituents comprise at least one member selected from the class consisting of methyl, ethyl, vinyl, allyl, cyclohexenyl and phenyl groups, said polysiloxane oil comprising polysiloxane molecules containing an average of from 1 to 2 lower alkoxy groups bonded to each of the terminal silicon atoms.

14. The process of claim 11 wherein said silica filler is treated with a mixture of ingredients selected from the class consisting of cyclicpolysiloxanes, silazanes, and mixtures thereof.

15. The process of claim 11 wherein the organopolysiloxane polymer and blends of polymers contain from 0.001 to 0.7 mole percent of vinyl substituent radicals.

16. The process of claim 11 wherein there is present from 0.5 to 5 parts of a bridging agent of the formula,
R′Si (OR²)₃ 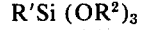
where R′ is selected from the class consisting of vinyl and allyl and R² is an alkyl radical of 1 to 8 carbon atoms.

17. The process of claim 11 wherein there is present from 0.1 to 10 parts of a fibrous material selected from the class consisting of polytetrafluoroethylene, dacron, cotton, polyester fibers and asbestos.

18. The process of claim 11 wherein there is present 0.1 to 5 parts of a heat stabilizer additive selected from the class consisting of iron oxide, lanthanum 2-ethylhexonate and cerium 2-ethylhexonate.

19. The process of claim 11 wherein the curing agent is dicumyl peroxide.

20. The process of claim 11 wherein the catalyst is 2,5-bis(t-butylphenoxy)2,5-dimethylhexane.

* * * * *